United States Patent Office 3,238,071
Patented Mar. 1, 1966

3,238,071
PROCESS OF TREATING EXPLOSIVELY
CLAD METALS
Arnold H. Holtzman, Cherry Hill Township, N.J., and
Andrew Pocalyko, Newark, Del., assignors to E. I. du
Pont de Nemours and Company, Wilmington, Del., a
corporation of Delaware
No Drawing. Filed July 9, 1963, Ser. No. 293,849
8 Claims. (Cl. 148—11.5)

This application is a continuation-in-part of my application Serial No. 191,724, filed May 2, 1962, now abandoned, for Process.

The present invention relates to a method for the manufacture of thin sections of two or more integrally connected metals.

The making of composite metal pieces containing two or more metals integrally connected can be accomplished in several ways. The method for accomplishing this for the present invention consists of treating the conjoined metal pieces with an explosive. This process involves forming a characteristic metallurgical bond between two or more layers of metals by explosively driving the layers together under specific conditions as is described in Belgian Patent 599,918.

As contrasted with explosive cladding, conventional methods which are used to bond metals are as follows: (1) the metals can be electrowelded together, (2) a layer of brazing metal can be placed between the two metals to be joined and heated to melt the brazing metal, (3) a sheet of one metal can be placed adjacent to a sheet of a different metal and the combination hot rolled.

Hot rolling is the most widely used today for cladding. Some metals, however, are deleteriously affected by heat applied during rolling operations. In some cases intermetallic phases are formed at the junction of the two different metals. These phases are brittle and if the diamond pyramid hardness is greater than about 450, the bonded products will not withstand compressive forces such as that encountered in cold rolling. Likewise, during conventional cladding processes, some metals absorb embrittling agents from the air and, as a result of brittle phases so formed, the resulting bonded products will not withstand cold rolling without cracking. In addition to the foregoing, other disadvantages of hot rolling techniques for cladding are that different metals have a different degree of rollability which results in excessive scrap loss and different metals also have different thermal expansion resulting in bond separation or residual stresses. Also, some metals melt at temperatures used in hot rolling.

The disadvantages enumerated above for hot rolling apply to the first two conventional methods of making clads because heat is involved in both the welding and casting operations. Furthermore, the addition of a third metal, such as a brazing metal, in order to effect a bond introduces several disadvantages. The technique is costly and difficult to handle because in order to get a good bond uniform pressure must be applied to the whole area to be bonded.

Some of the foregoing disadvantages can sometimes be overcome by operating in an inert atmosphere. However, such operation is expensive and can only be justified in the case of metals having high intrinsic value. Also, some pairs of clad metals which form the aforementioned brittle phases can be cold rolled if the cladding layer is very thin, e.g., 2 mils or less thick. However, use of such thin clad layer greatly decreases the usefulness thereof, e.g., corrosion resistance or conductivity. On the other hand, if the thicker clad layer is used, the brittle phases formed in conventional cladding techniques prevent subsequent cold rolling.

As a result of the foregoing, heretofore there has been no satisfactory method for making sheets of certain integrally bonded or clad metals. Hot forming techniques merely accentuate the problems discussed above with respect to conventional cladding methods. Cold rolling of such clad composites results in cracking and separation of the composites into their constituent layers. The clad composites with which the aforementioned problems exist can be defined as multilayered composites having at least two thick layers, that is, layers at least about 10 mils thick, the boundary zone between the layers containing intermetallic compounds or other hard phases having a diamond pyramid hardness of greater than about 450.

In accordance with this invention, it has been discovered that composite clads prepared as described in Belgian Patent 599,918 can be formed into thin sheets even though hard phases such as intermetallic compounds or other hard phases such as carbides and silicides are formed in the bond zones therein and even though comparable composite cladding techniques are not and cannot be so processed. Although the main features of the aforementioned cladding process are described more fully hereinafter and illustrated in detail in the aforementioned Belgian patent, such cladding process will be referred to hereinafter, for simplicity, as low velocity explosive cladding.

The process of this invention comprises reducing the thickness of a multilayered metal composite by cold rolling, and annealing the resulting product at a temperature below the melting point of the lowest melting layer therein, said composite comprising two metal layers each having a thickness of at least 10, and preferably about 60–500 mils, said layers being joined by low velocity explosive cladding and having in the bond zone therebetween a hard phase having a diamond pyramid hardness of greater than about 450 and sometimes greater than 700.

As indicated hereinbefore, the clad composites used in the process of this invention are prepared by the low velocity cladding process described in Belgian Patent No. 599,918. This process comprises supporting at least one layer of cladding metal parallel to the surface of a layer of metal to be clad, the inside surface of the layer of cladding metal being spaced from the surface of said metal to be clad, placing a layer of detonating explosive on the outer surface of the cladding layer or layers, the detonating explosive having a velocity of detonation less than 120%, and preferably less than 100%, of the velocity of sound in that metal in the system having the highest sonic velocity and thereafter initiating the explosive so that the detonation is propagated parallel to the metallic layers. The spacing, or standoff, between any two layers to be clad must be at least about 0.001". Depending on the particular metal layer used greater separations can be used, however, in general, separation of more than 0.5" is not convenient or necessary. The loading of the detonating explosive, which usually has a detonation velocity of on the order of 1200 to 5500 meters per second, varies with the particular metals being clad and the standoff therebetween. In general, conventional low velocity explosives at loadings of about 2 grams/in.² to 50 grams/in.² can be used.

The explosive cladding process carried out as described above and in the aforementioned Belgian patent yields composites which can be processed directly as described above in accordance with this invention and the composites need not be subjected to drastic straightening or other forming operations prior to cold rolling. In the process of this invention it is preferred to use clads prepared as described above in which the bond zone had discrete, relatively periodic regions or pockets of homogeneous alloy separated by substantially continuous direct metal-to-metal bonding over more than about 30% of the total area of contact. In general, composites with such bond zones are most suitable for very drastic cold reduction in accordance with the process of this invention. Composites with such bond zones are described in more detail in copending application Serial No. 217,776, filed August 3, 1962, by George R. Cowan, John J. Douglas and Arnold H. Holtzman. In general, such preferred bond zones are favored by using lower detonation velocity explosives and greater standoff in the low velocity cladding process described above.

Although, for simplicity, the process of this invention is described herewith with respect to composites having two low velocity explosive clad metal layers, it is also applicable to composites, for example, having three or more such clad layers as well as clads wherein at least one of the explosively clad layers have been previously joined by conventional cladding techniques to another layer in which the aforementioned problems do not exist, that is, for example, another layer which does not form brittle intermetallic compounds therewith. Examples of composites which can be processed in accordance with this invention are tantalum-steel, aluminum-steel, columbium-steel, molybdenum-steel, ziraconium-steel, titanium-steel, titanium-nickel, titanium-zinc, titanium-aluminum, titanium-copper and copper-aluminum low velocity explosively clad composites as well as composites meeting the above criteria in which one or more of the indicated layers is an alloy containing, for example, 50% or more of the named metals such as Inconel-aluminum, titanium-brass, Zircalloy 2-steel composites. Of course, as is obvious to those skilled in the art, each layer of the composite should have sufficient ductility by itself to be cold rolled. In general, such requirement is met when each layer has a diamond pyramid hardness of less than about 450.

Diamond pyramid hardness is an indentation hardness test employing a 136° diamond pyramid indenter and variable loads to give one hardness scale for all ranges of hardness from very soft lead to tungsten carbide. The diamond pyramid hardness of the phases in bond zones in the composites of this invention can be determined in the conventional manner by sectioning a sample of composite perpendicular to the layers thereof, etching or polishing the sectioned surface to clarify the bond zone, and making a representative number of indentations in the phases observed therein through the microscope.

The instant inventive process comprises the following steps which are schematically depicted as follows:

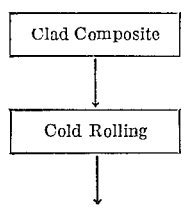

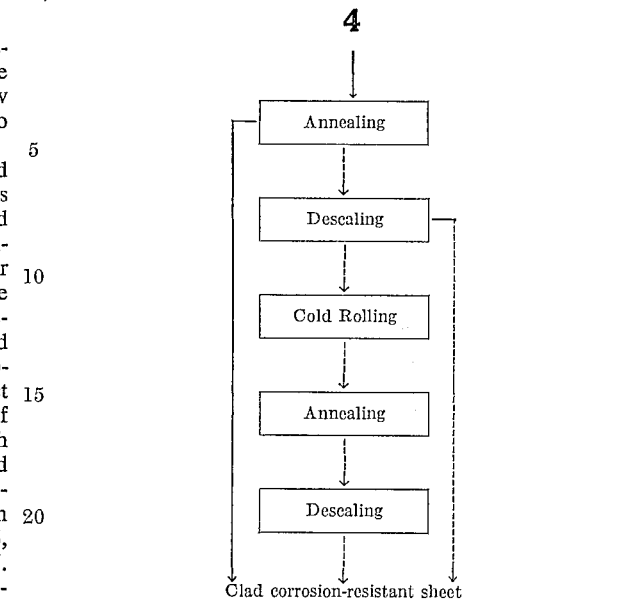

In the above diagram, the dashed lines indicate optional process steps described hereinafter. As illustrated above, the composite metal slab is cold rolled to give size reduction; the slab is then annealed; the slab is then descaled if necessary; and the slab is cold rolled, annealed and descaled, if necessary in subsequent steps if further thickness reduction is needed.

If desired the composite can be annealed before cold rolling in order to increase the amount of thickness reduction obtainable by cold rolling.

Because of power requirements, cold rolling resulting in thin sections, is usually carried out in several steps. If the predetermined thickness desired can be obtained in one rolling operation, however, no subsequent rolling steps are required. The maximum reduction in thickness which can be accomplished in one rolling operation varies with different metals but in general varies from about 20 to about 90% of the original thickness. After each cold rolling, annealing is carried out in order to eliminate the effects of cold working caused by rolling and, if necessary, the scale caused by annealing is removed. Cold rolling as used herein refers to conventional rolling of slab or sheet stock at about ambient or autogeneous temperatures.

Various combinations of metals vary in the degree to which they can be rolled without annealing. The following table shows typical ranges for rolling various combinations:

| Metal combination | | Percent of original thickness | |
|---|---|---|---|
| Cladding metal | Backer | From | To |
| Titanium | Steel | 20 | 40 |
| Tantalum | do | 50 | 95 |
| Copper | Aluminum | 50 | 90 |
| Stainless steel | do | 30 | 60 |
| Titanium | Nickel | 20 | 50 |
| Do | Copper | 20 | 50 |
| Aluminum | Steel | 50 | 90 |

The descaling treatments used are adapted to the particular metals being descaled. For example, sodium hydride descaling is suitable for carbon steel, stainless steel, nickel, Monel, Inconel, copper, Nichrome, high chrome steels, cobalt-nickel steel; brass and bronze, but not suitable for tantalum and aluminum. Aqueous sulfuric acid is a suitable descaling agent for steels, tantalum, etc. Aqueous nitric acid is a suitable descaling agent for aluminum and stainless steel.

The descaling treatment must be carefully chosen so that no one of the metals in the composite are excessively attacked. In some cases each side of a composite can be descaled separately by different agents by protecting one side while the other is being descaled. The descaling methods used are conventional in the art and the details of temperature, time, acid strength and other factors will depend on the particular metals used. In the case of highly oxidation resistant metals, an abrasive action by a polishing wheel or the like usually is sufficient for descaling.

The metal between each cold rolling operation must also be annealed. Most metals significantly work harden during cold rolling and this hardness must be removed before the next cold rolling operation in order to reduce the thickness an additional amount. As with descaling, the annealing operation is conventional in the art.

The annealing temperature chosen is carefully selected with consideration for the melting points of the metals in the clad. Preferably the annealing temperature is at least about half the melting point of the highest melting metal of the combination expressed in degrees Kelvin. Where a low melting metal such as aluminum or zinc is one metal of the clad, however, this requirement cannot always be met. In any case, the annealing temperature should be less than the melting point of lowest melting layer in the clad.

The cold rolling is performed by conventional equipment. Either tandem mills or reversing mills are suitable but from the standpoint of high output the tandem mills are preferred.

Sandwich rolling can also be performed where two sheets, for example, each consisting of composite clad metals can be rolled simultaneously.

The invention is more thoroughly illustrated with the aid of the following examples. Parts and percentages, where given, are by weight.

*Example 1*

A 20-mil layer of titanium is clad onto a 3/16 inch-thick plate of mild steel in the following manner. The titanium sheet which measures 3 inches by 6 inches is covered on one side with a ½-inch-thick layer of polystyrene foam and the polystyrene layer is covered with a ½-inch layer of the soda-amatol (composition: 35% $NaO_3$, 32% TNT, 33% $NH_4NO_3$, detonation velocity 2900 meters/sec.). The edges of the titanium-polystyrene-explosive "sandwich" are sealed with waterproof tape, and the sandwich is placed on the mild steel plate with a spacing between the titanium layer and the steel layer of 0.0138 inch provided by uniform particles of iron powder. The iron particles used pass through No. 45 mesh and are held on No. 100 mesh. The edges of the completed assembly also are sealed with tape, and an electric initiator is attached at one corner of the explosive layer. The assembly is then immersed in water, and the explosive is initiated. Excellent bonding of the titanium onto the steel plate results, i.e., examination revealed complete, firm bonding across greater than 95% of the area of any interface. Examination of the bond zone shows discrete regions of homogeneous alloy separated by substantially continuous direct metal-to-metal bonding. At least one phase in the bond zone has a diamond pyramid hardness greater than 500 measured as described hereinbefore.

The clad combination is passed through a cold rolling mill and cold rolled to a total thickness of 140 mils. The sheet is then annealed for 20 minutes at 1292° F. and descaled in a molten sodium hydroxide bath at 700° F. containing 2% sodium hydride for 1 hour.

The combination is again passed through the rolls and cold rolled to 100 mils, the predetermined thickness desired, annealed and descaled as above.

The final sheet has excellent corrosion resistance. Exposure of the titanium side by immersing in 5% sodium chloride solution for 5 days shows no evidence of corrosion.

The sheet can be bent at 90° around a mandrel having a radius of 200 mils without cracking or layer separation.

Further reduction in thickness to about 70 mils can be attained by passing again through the rolls. Again the sheet can be bent 90° over a 70 mil radius mandrel without layer separation after heat treatment and descaling.

*Example 2*

The explosive employed in this example is a thin uniform sheet of a flexible explosive composition comprising 20% very fine pentaerythritol tetranitrate (PETN), 70% red lead, and, as a binder, 10% of a 50/50 mixture of butyl rubber and a hermoplastic terpene resin [mixture of polymers of β-pinene of formula $(C_{10}H_6)_n$], commercially available as "Piccolyte" S-10 (manufactured by the Pennsylvania Industrial Chemical Corporation). Complete details of this composition and a suitable method for its manufacture are disclosed in U.S. Patent No. 3,093,521. The composition is readily rolled into sheets and detonates at a velocity of about 4100 meters per second.

A 30-mil layer of tantalum is clad onto a 3/11 250-mil-thick plate of mild steel in the following manner. The tantalum sheet which measures 3 inches by 6 inches is covered on one side with a ½-inch-thick layer of polystyrene foam and the polystyrene layer is covered with a layer of the above explosive composition having a weight distribution of 10 grams per square inch. The edges of the tantalum-polystyrene-explosive "sandwich" are sealed with waterproof tape, and the sandwich was placed on the mild steel plate with a spacing between the tantalum layer and the steel layer of 0.0138 inch provided by uniform particles of iron powder. The iron particles used pass through No. 45 mesh and are held on No. 100 mesh. The edges of the completed assembly also are sealed with tape, and an elastic initiator is attached at one corner of the explosive layer. Excellent bonding of the tantalum onto the steel plate results, i.e., examination revealed complete firm bonding across greater than 95% of the area of any interface. At least one phase in the bond zone has a diamond pyramid hardness of greater than 850. This combination is passed through a rolling mill and cold rolled to 140 mils, the predetermined thickness desired. The combination is then annealed at 2030° F. in a vacuum furnace. A sample of the combination can be bent 90° over a mandrel of 140 mils radius without layer separation or cracking occurring. No descaling treatment is necessary because of the vacuum annealing.

Tantaulm-on-steel clads made heretofore come apart when cold rolled.

*Example 3*

A layer of type 304L stainless steel 10 mils thick is explosively clad to a layer of aluminum alloy containing 5.5% zinc, 2.5% magnesium, 1.5% copper and 0.3% chromium (Alcoa 7075) 75 mils thick by the general procedure described in Example 1. At least one phase in the bond zone between the aluminum and stainless steel layers has a diamond pyramid hardness of greater than 500. This combination is cold rolled to give a sheet 47 mils thick. The sheet is useful for achitectural panels without annealing but can be annealed at about 1202° F. to give a more flexible sheet.

*Example 4*

An explosively clad sheet is made exactly as the one in Example 1 except that the 20 mil titanium is clad on both sides of the killed steel. The first cold rolling operation reduces the thickness of the clad sheet to 150 mils and the second to 110 mils. Annealing and descaling are accomplished as in Example 1. Again the sheet can be bent around a mandrel 200 mils in radius without cracking or separation of layers.

Clads of the following metals, prepared by the general low velocity cladding procedures previously described, are cold rolled according to the above procedure with similar results:

| Metal | Thickness (mils) | Metal | Thickness (mils) | Diamond pyramid hardness of at least one intermetallic compound between the two metals |
|---|---|---|---|---|
| Columbium | 10 | Steel | 500 | >750 |
| Molybdenum | 25 | ....do.... | 750 | >700 |
| Zirconium | 50 | ....do.... | 250 | >700 |
| Titanium | 100 | Nickel | 500 | >500 |
| Do | 30 | Zinc | 100 | >450 |
| Do | 60 | Aluminum | 250 | >450 |
| Do | 25 | Copper | 500 | >450 |
| Copper | 50 | Aluminum | 50 | >500 |

*Example 5*

A 4-inch by 6-inch sheet of ⅛-inch copper is clad to a similar sheet of ⅛″ aluminum by the technique of Example 1 using ¾-inch-thick layer of soda amatol (as described in Example 1) as the explosive and a 45 mil standoff. The bond zone has the character described for the clad in Example 1 and contains at least one phas having a diamond pyramid hardness of greater than 500.

The composite is cold rolled to 0.025 inch and annealed at 572° F. for fifteen minutes.

The rolled composite is bent over a mandrel having a radius of 50 mils without separation of layers.

*Example 6*

A sheet of ⅛-inch mild steel is clad to ⅛-inch aluminum using the procedure of Example 5. At least one phase in the bond zone has a diamond pyramid hardness of greater than 500. The composite is cold rolled at 0.025 inch and annealed at 932° F. for five minutes. The rolled sheet is bent over a mandrel of 50 mils radius without separation of layers.

We claim:

1. A process which comprises reducing the thickness of a multi-layered metal composite by cold rolling, and annealing the resulting product at a temperature below the melting point in the lowest melting layer therein, said composite comprising two metal layers each having a thickness of at least 10 mils, said layers being joined by low velocity explosive cladding and having in the bond zone therebetween a hard phase having a diamond pyramid hardness of greater than about 450.

2. A process of claim 1 wherein said explosively clad layers are a titanium layer and a steel layer.

3. A process of claim 1 wherein said explosively clad layers are a tantalum layer and a steel layer.

4. A process of claim 1 wherein said explosively clad layers are a stainless steel layer and an aluminum layer.

5. A process of claim 1 wherein said explosively clad layers are an aluminum layer and a steel layer.

6. A process of claim 1 wherein said explosively clad layers are a copper layer and an aluminum layer.

7. A process of claim 1 wherein the bond zone between said explosively clad layers has discrete periodic regions of homogeneous alloy separated by substantially continuous direct metal-to-metal bonding extending over more than 30% of the total area of contact.

8. A process of claim 7 wherein the annealing temperature is at least about one-half the melting point of the highest metal layer present expressed in degree Kelvin.

References Cited by the Examiner

UNITED STATES PATENTS

| 2,417,760 | 3/1947 | Keene | 148—27 |
| 2,697,869 | 12/1954 | Kingston et al. | 148—12 |
| 3,024,526 | 3/1962 | Philipchuk et al. | 29—421 |
| 3,036,374 | 5/1962 | Williams | 29—470.1 |
| 3,060,879 | 10/1962 | Staba | 29—421 |

DAVID L. RECK, *Primary Examiner.*